United States Patent [19]

Maeno

[11] 4,431,360
[45] Feb. 14, 1984

[54] CONTAINER FOR THE LOADING AND TRANSPORTING OF GOODS

[76] Inventor: Mamoru Maeno, Toko Manshion, 19-705-go, 2-banchi, 2-chome, Nisinakajima, Yodogawa-ku, Osaka-shi, Osaka Pref., Japan

[21] Appl. No.: 285,836

[22] Filed: Jul. 22, 1981

[51] Int. Cl.³ ..................... B65G 65/42; B60P 1/00
[52] U.S. Cl. .................... 414/294; 414/298; 414/325; 414/327; 414/509; 414/513; 414/514; 414/517; 414/521
[58] Field of Search ............ 414/288, 294, 298, 323, 414/327, 352, 353, 373, 513, 509, 514, 521, 527, 572

[56] References Cited

U.S. PATENT DOCUMENTS

| | | |
|---|---|---|
| 2,129,796 | 9/1938 | Swift . |
| 2,563,158 | 8/1951 | Claffey ........................ 414/527 |
| 2,628,709 | 2/1953 | Steinmetz . |
| 2,679,941 | 6/1954 | Roesies . |
| 2,885,069 | 5/1959 | Bowen . |
| 3,265,192 | 8/1966 | Stadelman . |
| 3,529,738 | 9/1970 | Hunt . |
| 4,113,122 | 9/1978 | Lutz ........................ 414/521 X |

Primary Examiner—Robert G. Sheridan
Attorney, Agent, or Firm—Fisher, Christen & Sabol

[57] ABSTRACT

A container body for highway trailers, ships or aircraft, for loading and transporting goods provides a conveyor belt on the floor of the body with a vertical partition that is movable with the conveyor as the goods are loaded into, or removed from the body. The belt can be moved forwardly or backwardly by a transmission shaft and a separate portable, self-contained power source which can remain at a loading dock, thereby making it unnecessary to use the container vehicle's transport power source. An electrical control mechanism can be suitably connected to the container body at a loading dock to control operation of the conveyor belt because the portable power source, which may be an internal combustion engine provided with an electrically controlled reversing gearbox, also includes a battery and suitable connections to the container body to energize the control mechanism. The portable power source can be rolled about on castor wheels which vertically adjustable supports to permit alignment of the output shaft with the conveyor shaft, and the movable partition may have a hydraulically operated pusher for moving goods away from the rear open end of the container.

17 Claims, 12 Drawing Figures

CONTAINER FOR THE LOADING AND TRANSPORTING OF GOODS

BACKGROUND OF THE INVENTION

The present invention relates to containers to be loaded on transport means, such as truck-drawn trailers, ships and aircraft, for transportation of goods. It contemplates the provision of a container for the loading and transporting of goods comprising a conveyer belt arranged on the floor of the body of the container, said conveyor belt being slidably engageable with the floor surface as it is loaded with goods, a partition gate back and forth movably provided in the container body, load chains for moving the partition gate, both said load chains and said conveyor belt being connected to said partition gate, a transmission shaft provided in the container body for driving the conveyor belt through said load chains so that the conveyor belt within the container body can be driven when driving force is supplied to said transmission shaft.

SUMMARY OF THE INVENTION

Accordingly, it is an object of the invention to provide such a container into which said conveyor belt and load chains can be easily incorporated through a corrugated floor plate forming the floor of the container body and having a plurality of generally parallel ridges.

It is another object of the invention to provide such a container which has a partition wall movable back and forth through said load chains and adapted to exert an adequate tractive force on said conveyor belt having a comparatively large width.

It is a further object of the invention to provide such a container which permits efficient and safe loading into and unloading from the container of goods without cargo collapse.

It is another object of the invention to provide such a container which has a transmission shaft adapted to be supplied with driving force only when goods are loaded into or unloaded from the container, so that the container need not be provided with a source of driving force within its body, thus it being of simple construction and light in weight.

It is a still further object of the invention to provide such a container which can readily incorporate a conveyor belt and a transmission shaft without any substantial change over the conventional construction of container body, and more specifically, which permits substantial reduction of loading and unloading labor, thereby further developing the merit of containerization and economizing the cost of transportation.

BRIEF DESCRIPTION OF THE DRAWINGS

A preferred embodiment of the invention will now be described with reference to the accompanying drawings.

In the drawings.

DETAILED DESCRIPTION OF THE INVENTION

In the drawings, a square box-shaped container body 1, at its rear end, has openable and closable doors 2, 3 which are available for loading and unloading purposes. Reference numeral 4 indicates a full trailer having a plurality of running wheels 5 and adapted to be hauled by a tractor (not shown). Indicated by numeral 6 is a drive unit freely movable with casters 7. In the container body 1 there is arranged a conveyor belt 8 having a width slightly narrower than the narrower side of the container body 1, with its length somewhat larger than that of the longer side of the container body 1. The conveyor belt 8 is adapted to be in sliding engagement with the floor of the container body 1 as it is loaded with goods. A partition gate 9 is back and forth movably provided in the container body 1. It is of substantially the same width as the narrower side of the interior of the container body 1 and substantially of the same size as either end of the container body 1. There are provided load chains 10 for moving the partition gate 9 by traction, with both ends connected to the latter. The conveyor belt 8 is securely connected at one end thereof to the partition gate 9 and at the other end thereof to a portion of the load chains 10 through fastening means 11. At the innermost end of the container body 1 a transmission shaft 13 is supported in a bearing chassis. Sprockets 14, rotatably supported on the transmission shaft 13, are in engagement with the links of the load chains 10. On the loadingside floor of the container body there are provided rollers 15 and sprockets 16, all coaxially rotatably supported. The conveyer belt 8 is trained over the rollers 15, and the sprockets 16 are in engagement with the links of the load chains 10. Thus, by driving the transmission shaft 13 forward and reverse, the conveyer belt 8 and the partition gate 9 can be moved back and forth to permit loading into and unloading from the container body 1 of goods (a) as loaded on the belt 8.

In the drive unit 6 there are provided an engine 17 for driving the conveyer belt 8, a reduction gear case 18 for reducing and transmitting the output of the engine 17, a fuel tank 19, a battery 20, and an oil tank 21 for storing hydraulic oil. The drive unit 6 is also provided with expansion studs 23 which are adjustable by means of a hydraulic cylinder 22, said studs 23 being supported on casters 7. As can be best seen from FIG. 5, in the gear case 18 there are supported a shaft 26 integrally connected to an output shaft 24 of the engine 17 through a spline joint 25, a forward-reverse changeover shaft 27, a forward-reverse transmission shaft 28, and an output shaft 30 integrally connected to said transmission shaft 13 through a spline joint 29. The gear case 18 is fixed to the engine 17. A shaft case 31 in which said transmission shaft 13 is inserted at one end is provided in conjunction with the bearing chassis 12, and to said shaft case 31 is removably connected said gear case 18 through a vice-type holder 32 and set pins 33. The transmission shaft 13 is so arranged to be exposable outside the container body 1 so that the output of the engine 17 can be transmitted to the transmission shaft 13 to drive the conveyor belt in the container body 1. The input shaft 26 is connected to the forward-reverse changeover shaft 27 in interlocking relation through gears 34, 35, 36, electromagnetic, drytype multiple disc clutches 37, 38, forward and reverse, being mounted to the shaft 27 at both ends thereof respectively. And through the forward clutch 37 and gears 39, 40 or through reverse clutch 38 and gears 41, 42, 43, as the case may be, the forward-reverse transmission shaft 28 is connected to said shaft 27. The shaft 28 is connected to the output shaft 30 in interlocking relation through reduction gears 44, 45, 46 48, 49 and a safety clutch 50 adapted to cut power when the power exceeds the set load, whereby the driving force of the engine can be freely reduced to drive the transmission shaft 13, whether for forward run or for reverse run.

Figure 6:
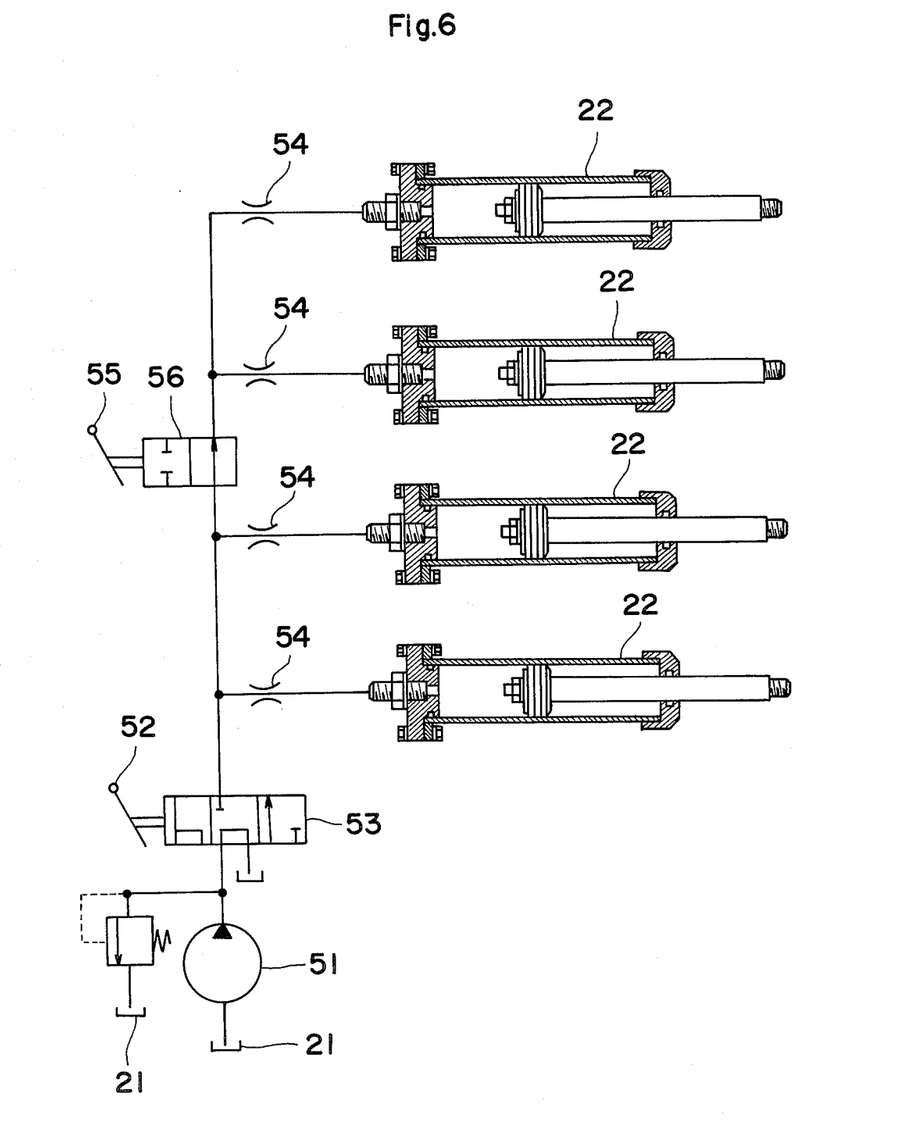
FIG. 6 is a hydraulic circuit diagram.

As FIG. 6 shows, there is provided a hydraulic pump 51 powered by said engine 17, said hydraulic pump 51 being hydraulically connected to the individual hydraulic cylinders 22 through a three-position three-port type hydraulic change-over valve 53 having a manual control lever 52 and individual throttle valves 54. And a two-position 2-port type hydraulic changeover valve 56 having a manual control lever 55 is hydraulically connected to any neighboring two of the hydraulic cylinders 22 through throttle valves 54, 54, and the drive unit 6 is adjusted as to its height through control of the changeover valve 53 by manipulating the lever 52. At the same time, the drive unit 6 is adjusted as to its horizontal position through the control of the changeover valve 56 by the lever 55 so that the unit 6 is positioned substantially level in all directions.

Figure 4:
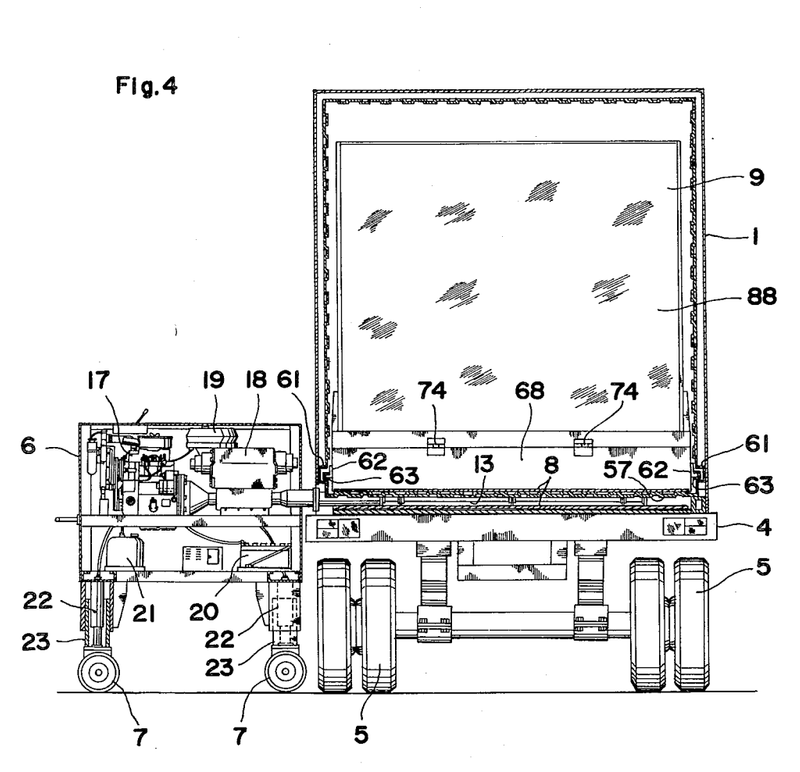
FIG. 4 is a section in rear elevation thereof.
Figure 7:
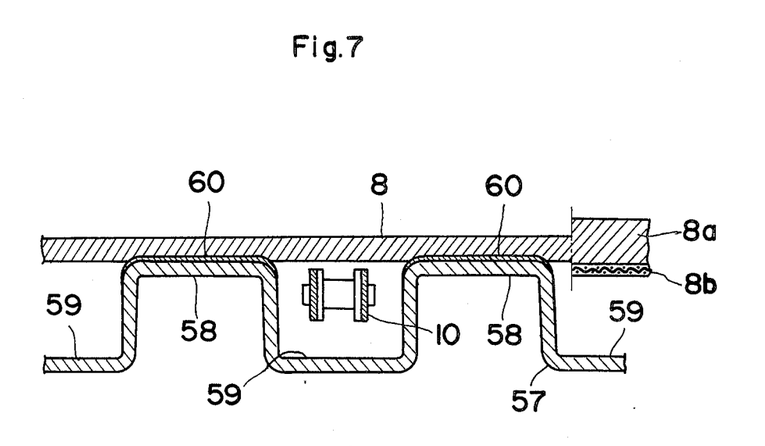
FIG. 7 is a fragmentary sectional view on an enlarged scale of the floor of the container.

As can be seen from FIGS. 4 and 7, the floor plate 57 of the container body 1 comprises a plurality of substantially parallel ridges 58 and a plurality of substantially parallel grooves 59 alternately arranged at equal intervals so as to form a corrugated pattern. The ridges 58 defined on the floor plate 57 in the longitudinal direction are coated with slide accelerating film 60. The conveyer belt 8 provided over the floor plate 57 comprises a synthetic rubber belt portion 8a and a canvas belt portion 8b formed on the underside thereof. The load chains 10 are inserted in the grooves 59 formed on the belt 8. When goods are loaded on the belt 8, the underside of the loaded portion of the belt 8 is depressed by the weight of the goods and the belt 8 is guided through sliding engagement between the depressions caused to the underside of the belt 8 and the ridges 58, whereby the belt 8 is prevented from lateral runout.

Figure 1:
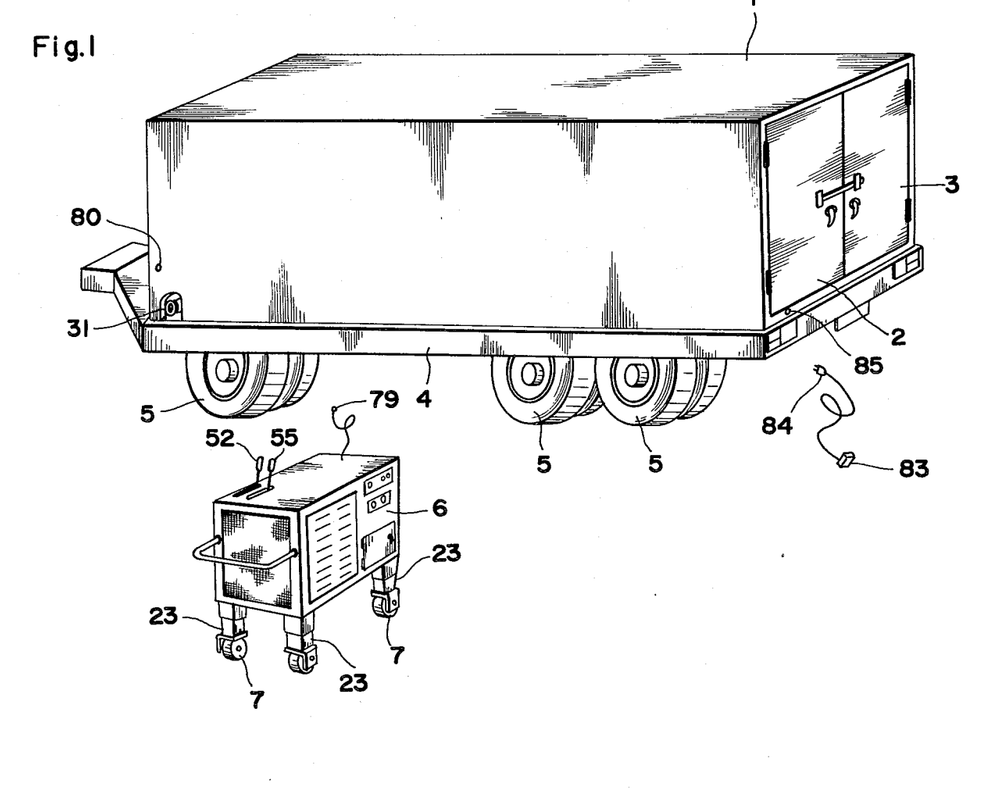
FIG. 1 is a general view in perspective of an embodiment of the invention.
Figure 2:
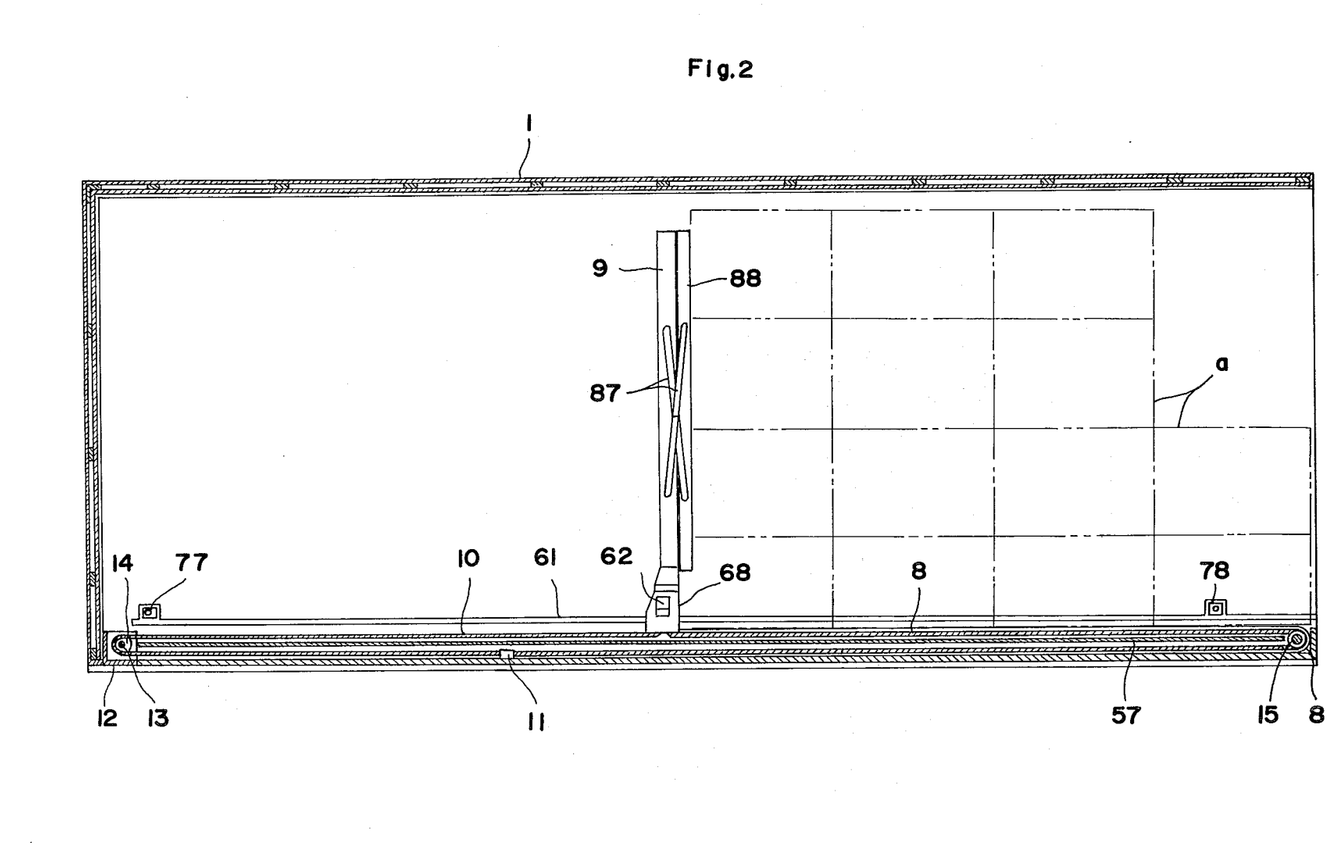
FIG. 2 is a sectional side elevation illustrating key parts of the embodiment.
Figure 3:
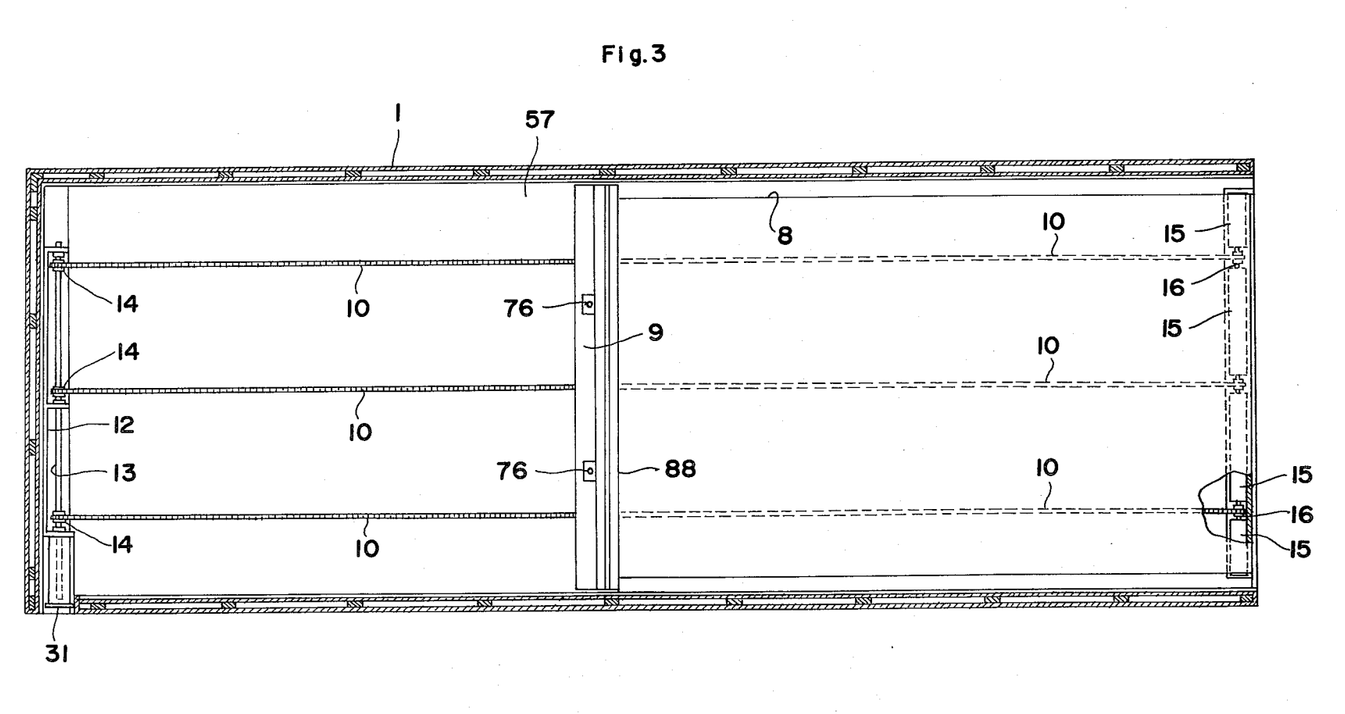
FIG. 3 is a plan view in section thereof.
Figure 8:
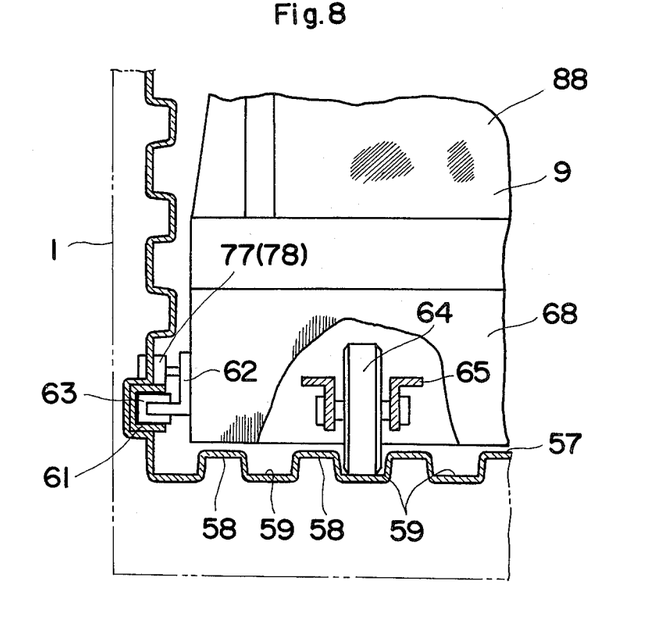
FIGS. 8 and 9 are partial explanatory representations of the floor and movable partition, respectively.

As shown in FIGS. 2 and 8, guide rails 61, 61 guiding the partition gate 9 are provided in the container body 1 on both sides, and slide members 63 are mounted to the gate 9 on both sides thereof, said slide members 63 being slidably fitted in the guide rails 61, 61. Wheels 64 supporting said gate 9 are attached to the gate 9 through brackets 65, being rotatably fitted in the grooves 59 on the floor plate 57. Thus, the partition gate 9 is guided and supported by said guide rails 61, slide members 63 and said grooves 59 and wheels 64.

Figure 9:
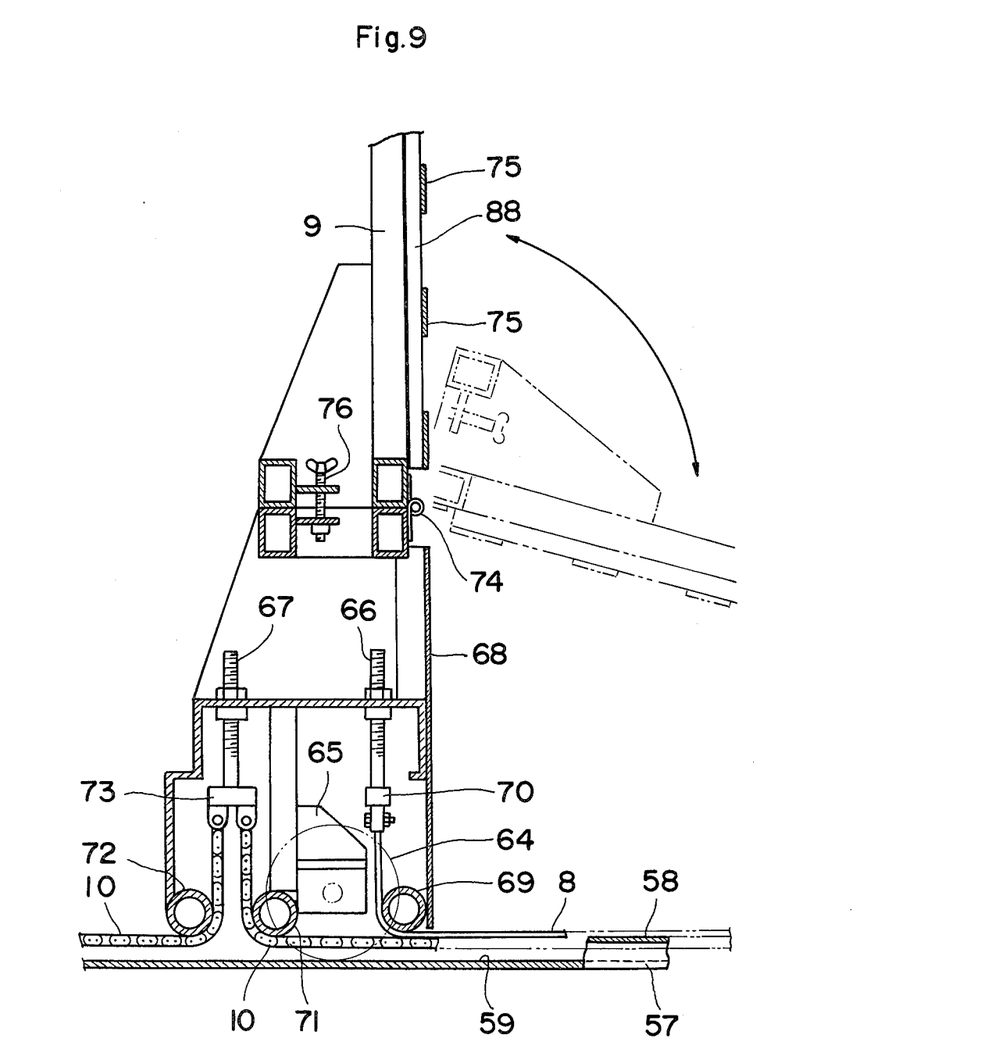

As FIG. 9 shows, tension bolts 66, 67 for adjusting the tension of said conveyer belt 8 and of load chains 10 are provided on the base 68 of the partition gate 9. One end of the belt 8, folded upward through a guide pipe 69, is securely connected to one of the tension bolts 66 through a connector 70, and both ends of the load chains 10 folded upward through guide pipes 71, 72, are securely connected to the other tension bolt 66 through connectors 73, so that tension adjustment of the belt 8 and of the load chains 10 can be independently performed through the individual bolts 66, 67. The partition gate 9 mounted on the base 68 is tiltable rearwardly of the container body 1 through a hinge 74. The gate 9, removably fixed to the base 68 by means of a screw bolt 76, may be removed from the base 68 by unscrewing the screw bolt 76 and tilted rearwardly of the container body 1 if access into the space between the gate 9 and the front portion of the container body 1 is required, so that it is possible to go across the gate 9 for access to the front portion of the body 1 and the backside of the gate 9 for cleaning, maintenance and inspection purposes.

Figure 10:
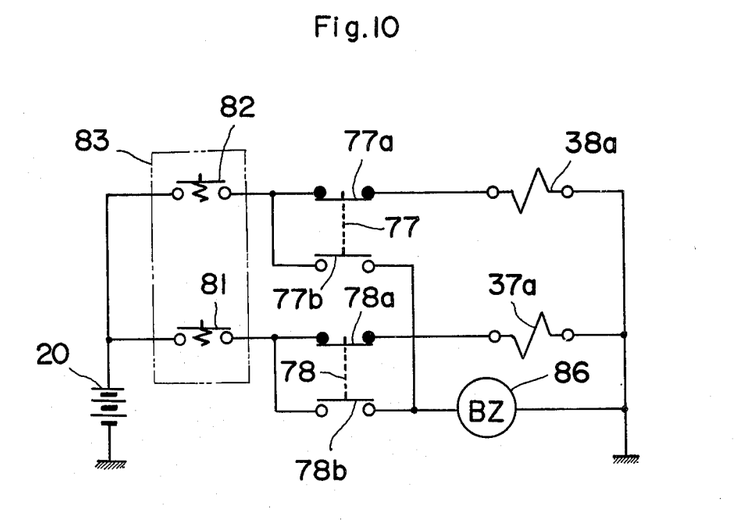
FIG. 10 is an electric circuit diagram.

As can be seen from FIGS. 1, 2, 5 and 10, limit switches 77, 78 detecting the starting and terminal ends of the travel of the partition gate 9 are provided at both ends of the guide rails 61, and there are provided a plug 79 and a plug receptacle 80 for connecting the battery and the like to the switches 77, 78. Also, there is provided a control box 83. A plug receptacle 85 for receiving a plug 84 in the control box 83 is provided on the rear end of the container body 1. Control switches 81, 82 are connected to the limit switches 77, 78 through said plug 84 and plug receptacle 85. As shown in FIG. 10, the battery 20 is connected to the forward and reverse switches 77, 78; the forward switch 81 is connected to the solenoid 37a of the forward clutch 37 through a constantly closed contact 78a of the limit switch 78; and the reverse switch 82 is connected to the solenoid 38a of the reverse clutch 38 through a constantly closed contact 77a of the limit switch 77. Then, the forward switch 81 or reverse switch 82 is controlled to energize the solenoid 37a or 38a, as the case may be, whereby the forward clutch 37 or reverse clutch 38 is actuated to transmit power to drive the partition gate 9 and conveyer belt 8 forwardly or reversely through the load chains 10. A buzzer 86 is connected to the forward and reverse switches 81, 82 through constantly open contacts 77b, 78b of the limit switches 77, 78 so that when the partition gate 9 reaches the starting or terminal end of its run signals are given to the effect through the buzzer 86.

Figure 11:
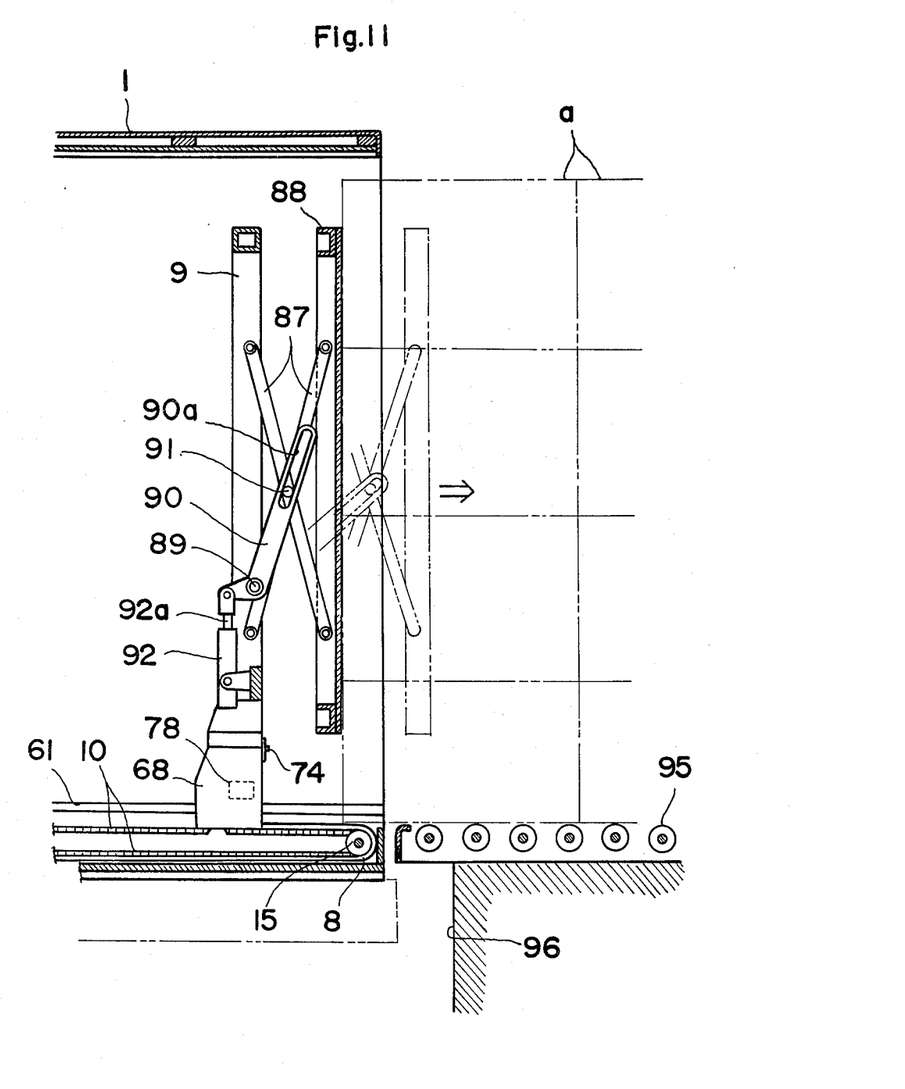
FIG. 11 is a fragmentary sectional view in side of the movable partition elevation.
Figure 12:
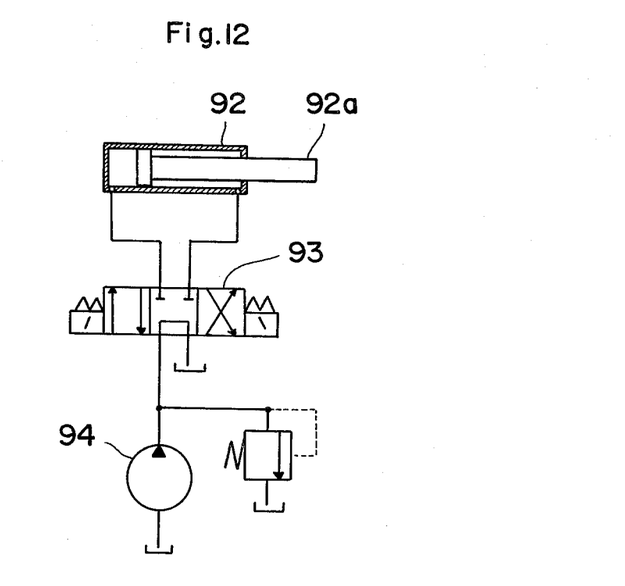
FIG. 12 is a hydraulic circuit diagram.

Further, as shown in FIGS. 11 and/or 12, a pusher gate 88 is longitudinally movably mounted to the partition gate 9 through X-shaped expansion links 87, with a pusher arm 90 movably supported at its mid-point by the partition gate 9 through a fulcrum shaft 89. One end of said arm 90 is connected to an intersection-point shaft 91 of the links 87 through a slot 90a of the arm 90, a piston rod 92a of a hydraulic cylinder 92 being connected to the other end of the arm 90. The hydraulic cylinder 92 is mounted to the partition gate 9 and pusher means for driving the cylinder 92 are also attached to the partition gate 9. The pusher means are provided with an electromagnetic hydraulic changeover valve 93 of 3-position 4-port type and a hydraulic pump 94 which is connected to the hydraulic cylinder 91 through said valve 93. The container body 1 is brought close to a platform 96 on which a roller conveyer 95 is provided. When the partition gate 9 is moved to the rear end of the container body 1, the pusher gate 88 is pushed out to pass the goods left on the conveyor belt 8 onto said conveyer 95.

Figure 5:
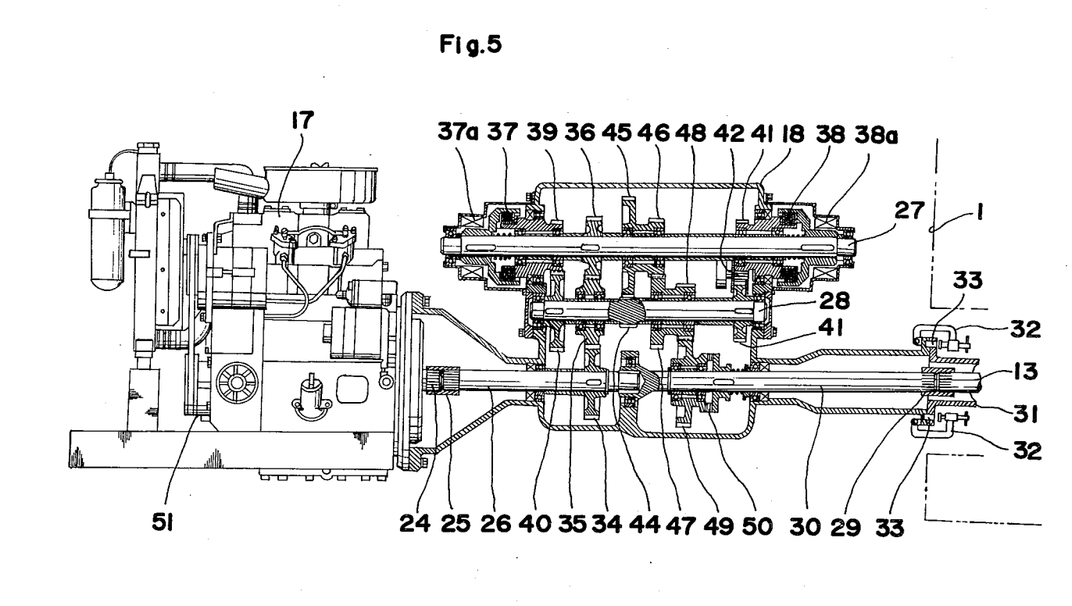
FIG. 5 is a fragmentary sectional view of the embodiment of an auxiliary drive unit.

The invention has been described in its preferred embodiment. To load goods (a) into or unload same from the container body 1 through the conveyer belt 8, the drive unit 6 is brought close to the container body 1 and its height is adjusted by actuating the hydraulic cylinders 22 through the control levers 52, 52. At the same time, as FIG. 5 shows, the output shaft 30 is connected, through the joint 29, integrally to the transmission shaft 13 at one end exposed outside the container body 1. The gear case 18 is coupled to the shaft case 31 through the setting pins 33, the both cases 18 and 31 being fixed together by means of the holders 32. Thus, the drive unit 6 is securely mounted to the container body 1 as illustrated in FIG. 4. Plugs 79, 84 are respectively coupled to the plug receptacles 80, 85 in the container body 1, and as FIG. 10 illustrates, the forward and reverse switches in the control box 83 are electrically connected to solenoids 37a, 38a for the forward and reverse clutches 37, 38.

Through the control of the forward switch 81 the solenoid 37a is energized to actuate the forward clutch 37, thus the output of the engine 17 being supplied to the transmission to drive the load chains 10 forward. Thereupon, the partition gate 9 and conveyer belt 8 are moved forward in the container body 1 to permit goods (a) to be loaded successively onto the belt 8 for delivery into the container body 1. At this time, the underside of the belt 8 is depressed by the weight of the goods (a) as FIG. 7 illustrates, and the so depressed portions of the belt 8 are brought into sliding engagement with the ridges 58 on the floor plate 57, whereby the belt 8 is prevented from lateral movement and allowed to run straight along the ridges 58 without any cargo collapse being caused.

If the reverse switch 82 is controlled, the solenoid 38a is energized to actuate the reverse clutch 38 and the output of the engine 17 is supplied to the transmission shaft 13 to drive the load chains 10 reversely. Accordingly, the partition gate 9 and conveyer belt 8 are both moved rearwardly of the container body 1, the goods on the belt 8 being thus successively delivered rearwardly of the container body 1. At the end of loading or unloading operation as above described, the drive unit 6 and the control box 83 are separated from the container body 1 and mounted to another container body 1. In this way, the drive unit 6 and control box 83 can be employed with a plurality of container bodies 1 for loading and/or unloading operation.

If the partition gate 9 reaches either front end or rear end of the container body 1, one of the limit switches 77, 78, as the case may be, is turned on to intercept the run of the conveyer belt 8, and as FIG. 11 shows, upon the partition gate 9 having reached the rear end of the container body 1, the pusher gate 88 is moved rearward to transfer remaining goods (a) on the conveyer belt 8 onto the roller conveyer 95 on the platform 96.

As is clear from the above description of the embodiment, the container in accordance with the invention comprises a conveyer belt 8 arranged on the floor of body 1 of the container, said conveyer belt being slidably engageable with the floor surface as it is loaded with goods, a partition gate 9 back and forth movably provided in the container body 1, load chains 10 for moving the partition gate, both said load chains 10 and said conveyer belt 8 connected to said partition gate 9, a transmission shaft 13 provided in the container body 1 for driving the conveyer belt 8 through said load chains 10 so that the conveyer belt 8 within the container body 1 can be driven when driving force is supplied to said transmission shaft 13. The invention is advantageous in that the container body 1 has a corrugated floor plate 57 forming its floor and having a plurality of generally parallel ridges 58, which fact permits said conveyer belt 8 and load chains 10 to be easily incorporated into the container, and in that the conveyer belt 8 having a comparatively large width can be suitably driven under an adequate tractive force exerted by said partition gate 9 adapted to be moved back and forth through said load chains 10. With this arrangement, the container permits safe and efficient loading thereinto and unloading therefrom of goods without cargo collapse. Moreover, the transmission shaft 13 may be supplied with driving force only during loading or unloading operation and accordingly the container need not be provided with a source of driving force within its body so that the container is of simple construction and light in weight. The conveyer belt 8 and transmission shaft 13 can readily be incorporated into a container of conventional design without requiring any substantial change in construction. The container according to the invention has a further remarkable advantage that it permits substantial labor saving in loading and unloading operation, thus further developing the merit of containerization and economizing the cost of transportation.

I claim:

1. A container for the loading and transporting of goods comprising a conveyor belt arranged on the floor of the body of the container, said conveyor belt being slidably engageable with the floor surface as it is loaded with goods, a partition gate back and forth movably provided in the container body, load chains and said conveyor belt being connected to said partition gate, a transmission shaft provided in the container body for driving the conveyor belt through said load chains so that the conveyor belt within the container body can be driven when driving force is supplied to said transmission shaft, wherein said partition gate includes pusher gate means movable with respect to the partition gate in a generally parallel direction for slidably pushing a load carried on said conveyor belt away from said partition gate.

2. Container according to claim 1, wherein the transverse dimensions of the partition gate are substantially the same as those of the transverse interior cross-section of the container body, said partition gate being subdivided into upper and lower sections, the upper section being hingedly mounted on the lower section for tiltable movement about a horizontal axis.

3. Container according to claim 1, wherein said partition gate includes hydraulic power means for actuating said movement of the pusher gate means.

4. A container according to claim 1, which includes manual control means associated with said container body for controlling the operation of a separable drive unit when connected to said transmission shaft to supply said driving force.

5. A container according to claim 4, wherein said manual control means is detachable from said container body.

6. A container according to claim 5, wherein said manual control means includes subsidiary control means to be separably connectable between said container body and a drive unit.

7. A container according to any one of claims 4, 5 or 6, wherein said manual control means is electrically energized, and said energy is supplied by said separable drive unit.

8. A container according to claim 7, wherein the separable drive unit includes means for reversibly driving said transmission shaft in response to operation of said manual control means.

9. A container according to claim 8, wherein the drive unit includes an internal combustion engine means having reversing gear means for driving an output shaft in forward and reverse directions controlled by electromagnetic clutch means.

10. A container according to claim 8, wherein manual control means includes limit switch means mounted in the body of the container for stopping movement of the conveyor belt when the partition gate is at a respective end of said body.

11. A container according to claim 8, wherein said partition gate includes pusher gate means movable toward and away from the partition gate for pushing a load carried on said conveyor belt away from said partition gate, and hydraulic power means for actuating movement of said pusher gate means 12. A container according to claim 1, wherein said driving force supplied to said transmission shaft comprises self-contained portable internal combustion engine means including reversing gear means provided with an output shaft for separable connection to one end of said transmission shaft.

13. A container according to claim 12 wherein said portable internal combustion engine means includes support means for rolling engagement with a supporting surface.

14. A container according to claim 13, wherein said support means includes at least three vertically extensible supporting studs terminating at their respective lower ends with a castor wheel.

15. A container according to claim 14, wherein said portable engine means includes hydraulic pump means, and said supporting studs include reversible hydraulic piston means, and manually operated control means connected with said hydraulic pump means and piston means for aligning said output shaft with said one end of the transmission shaft.

16. A container according to any one of claims 12, 13, 14 or 15, wherein the body of the container includes electrically energized manual switch control means for controlling movement of said conveyor belt, said portable engine means includes a source of electrical energy for energizing said manual switch control means, and separable connector means is provided for connecting said source of electrical energy to said manual switch control means.

17. A container according to claim 16, wherein said manual switch control means includes limit switch means for stopping rotation of said transmission shaft when said partition gate is at either one of two predetermined positions in the container body.

* * * * *